Figure 1:
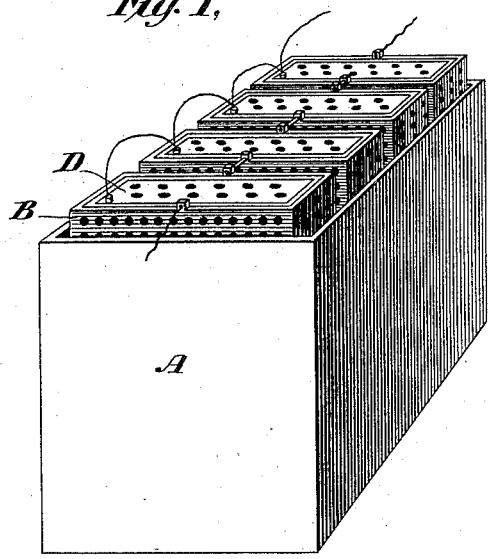

(No Model.)

G. A. WASHBURN.
STORAGE BATTERY.

No. 488,233. Patented Dec. 20, 1892.

Witnesses
C. E. Ashley
H. W. Lloyd.

Inventor
George A. Washburn
By his Attorney
Franklin L. Pope.

UNITED STATES PATENT OFFICE.

GEORGE ARTHUR WASHBURN, OF CLEVELAND, OHIO, ASSIGNOR, BY MESNE ASSIGNMENTS, TO THE FORD-WASHBURN STORELECTRO COMPANY, OF SAME PLACE.

STORAGE-BATTERY.

SPECIFICATION forming part of Letters Patent No. 488,233, dated December 20, 1892.

Application filed December 10, 1889. Serial No. 333,239. (No model.)

*To all whom it may concern:*

Be it known that I, GEORGE ARTHUR WASHBURN, a citizen of the United States, residing at Cleveland, in the county of Cuyahoga and State of Ohio, have invented certain new and useful Improvements in Secondary Batteries, of which the following is a specification.

My invention relates to certain improvements in the construction of secondary batteries. A secondary battery, as distinguished from a primary battery, consists essentially of a positive and a negative electrode; active or absorptive material maintained in contact with said electrodes, and an electrolytic solution permeating said active material. Batteries of this class generate no electricity of themselves, but become active only when charged by sending through them a current from an independent source of electric energy. In this manner they become potentially active, so that upon the completion of an external conducting circuit between their positive and negative electrodes, they are capable of giving a current of electricity. This process of charging and discharging may be repeated an indefinite number of times.

Prior to the date of my invention, the active material had been formed upon the surface of the electrodes by the disintegration, by a long-continued electrolytic action, of the material of the electrode itself; suitable active material had also been mechanically applied and made adherent to the surface of the electrode by which it was supported, such active material being in the form of a paste, paint or cement; perforations, cells and chambers had been formed in the metal of the electrodes, and the active material packed within said perforations, cells or chambers, instead of being applied to the surface of the electrodes, and in some instances the utilization of the electrode as a support for the active material had been entirely dispensed with; that is to say, the electrodes were not in any way coated with the active material, but the latter was placed loosely in contact therewith.

In the construction of a secondary battery, it is of the utmost importance to insure a maximum surface of contact between the electrolyte and the mass of active material upon which it is to act, and at the same time to maintain the said mass in position so that it is impossible for it to disintegrate and short-circuit the cell. In none of the hereinbefore described organizations has this result been satisfactorily attained.

My improvement consists in supporting the masses of active material in position in contact with the electrodes by means of a porous partition or diaphragm, through the walls of which the electric current passes, and in perforating said electrodes in such a manner as to afford a free circulation to the liquid electrolyte, and at the same time to permit said electrolyte to come in contact with and permeate every portion of the masses of active material.

Figure 2:
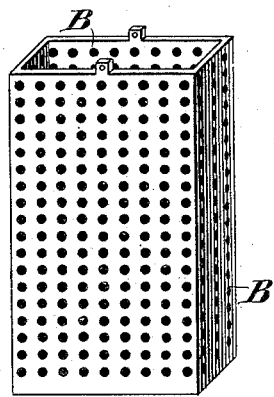
Figure 3:
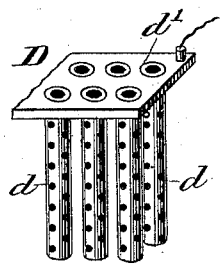

In the accompanying drawings, Figure 1 is a perspective view of a secondary cell embodying my invention; Fig. 2 is a perspective view of the outer electrode; Fig. 3 is a perspective view showing the preferred construction of the inner electrode, and Fig. 4 is a vertical transverse section of a complete cell, showing the parts in position.

Figure 4:
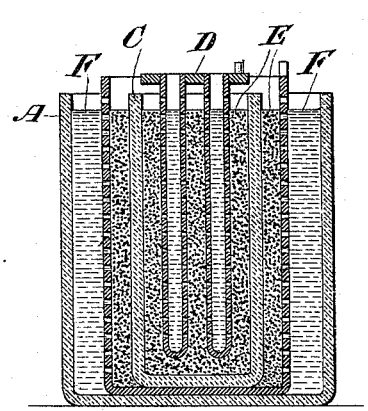

In Figs. 1 and 4, A is the containing cell, within which are placed one or more electrodes B, preferably of tubular form (herein shown as rectangular in cross-section) and of lead or other suitable metal or alloy for the purpose. Each said electrode is perforated with numerous holes, of such size as to permit free circulation of the electrolytic liquid, but at the same time small enough to prevent the escape of the loose mass of active material, which is placed in immediate contact with the inner surface thereof, as hereinafter explained.

Within each outer electrode B is placed a cell C of unglazed earthenware or other suitable porous material, open at the top and closed at the bottom, as is usual in primary batteries. It is preferably of material somewhat more porous in character than a similar cell which is suitable for use in a primary battery.

Within the porous cell C is placed a second electrode D, (which I prefer to construct in the manner best seen in Figs. 3 and 4) of one or more tubes $d\ d$, united in the latter case at one end by a metal tube-sheet $d'$. The walls of said tube or tubes are perforated with holes, in the manner and for the purpose hereinbefore explained, and illustrated in Figs. 3 and 4. This electrode may also be of lead or other suitable metal or alloy.

When the several parts or elements of the cell have been assembled in the manner hereinbefore described, and shown in Figs. 1 and 4, a mass of pulverized metal or metallic oxide, or other suitable absorptive and active material E, is filled into the entire space between the outer and inner walls of the porous cell C, and the opposite faces of the respective perforated metallic electrodes B and D, and in case the last named electrode consists of a plurality of tubes, as in Figs. 3 and 4, the interstices between said tubes are to be packed or filled with the active material in the same manner. Finally, a sufficient quantity of electrolytic solution of any suitable composition, as for example, dilute sulphuric acid, is poured into the space F between the outer electrode B and the containing cell C, and also into the interior of the tube or tubes $d\ d$ of the electrode D. By means of the perforations in the respective electrodes, the solution has free access to the whole mass of active material, thus promoting the rapidity and efficiency of the chemical action in charging and discharging the cell. When the inner and outer compartments have thus been supplied with a sufficient quantity of electrolyte, the cell is ready for action.

I claim as my invention:—

In a secondary battery, the combination, substantially as set forth, of perforated metallic electrodes, separated by an interposed porous diaphragm, and insoluble active material permeated by an electrolytic solution, placed between and held in position by said diaphragm and electrodes.

Witness my hand to the foregoing specification this 3d day of December, 1889.

GEORGE ARTHUR WASHBURN.

Witnesses:
H. T. FISHER,
NELLIE L. McLANE.